Figure 1:
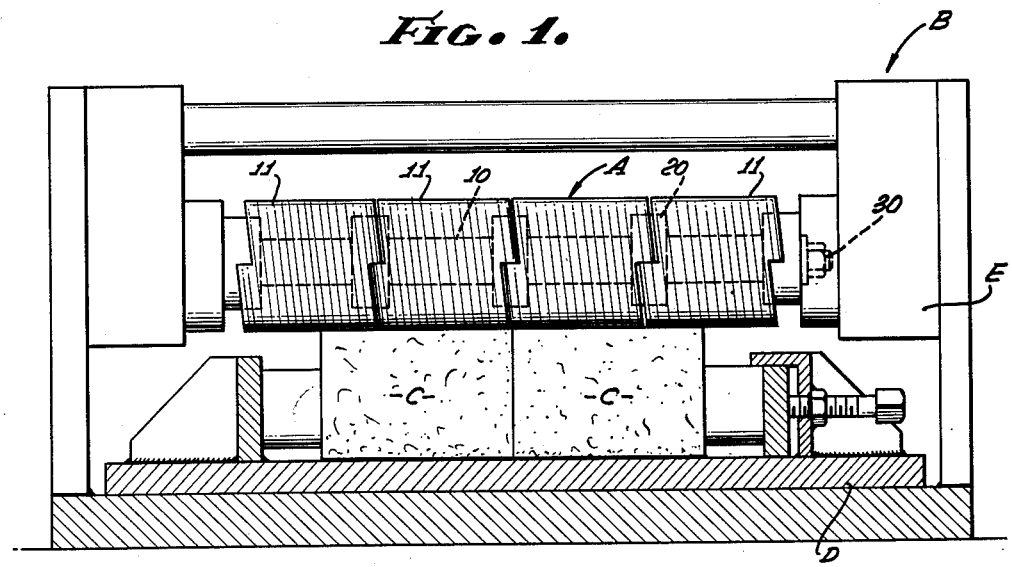

July 27, 1965   F. L. CHRISTENSEN ETAL   3,196,585
DIAMOND MILLING CUTTERS
Filed Sept. 6, 1963   2 Sheets-Sheet 1

FRANK L. CHRISTENSEN
DONALD H. MABEY
INVENTORS.

BY
Bernard Kriegel
ATTORNEY.

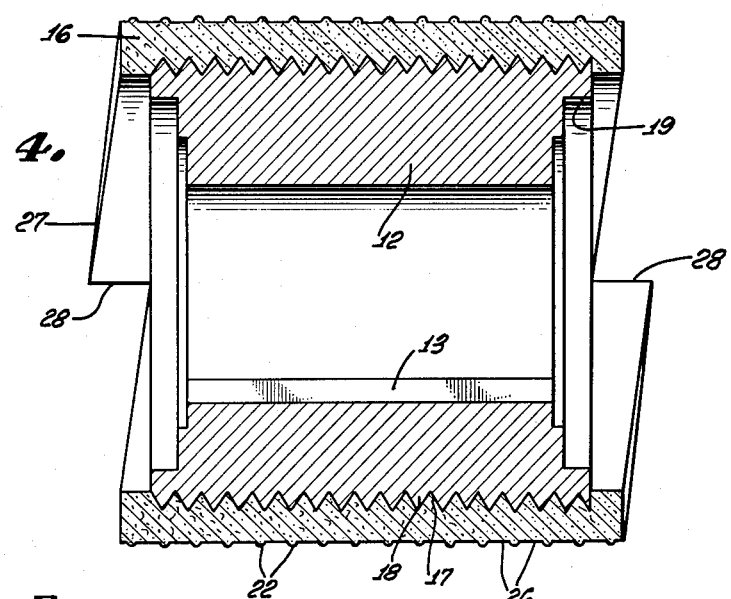
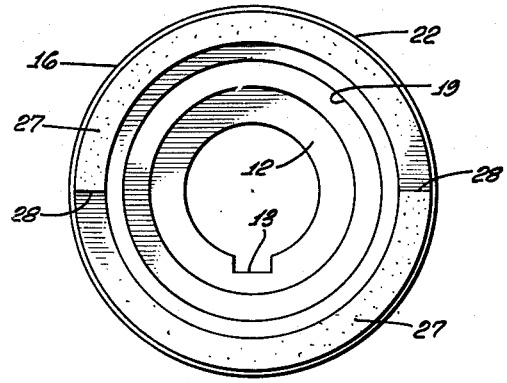
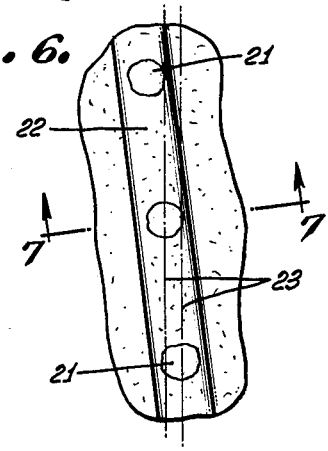
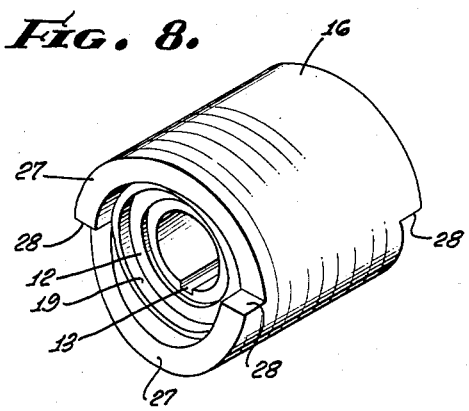
FRANK L. CHRISTENSEN
DONALD H. MABEY
INVENTORS.
BY
ATTORNEY.

United States Patent Office 3,196,585
Patented July 27, 1965

3,196,585
DIAMOND MILLING CUTTERS
Frank L. Christensen and Donald H. Mabey, Salt Lake City, Utah, assignors to Christensen Diamond Products Company, Salt Lake City, Utah, a corporation of Utah
Filed Sept. 6, 1963, Ser. No. 307,177
21 Claims. (Cl. 51—206)

The present invention relates to milling cutters, and more particularly to milling cutters for cutting, sizing or resurfacing non-metallic materials, such as refractories for furnace linings, brick, concrete, asphalt paving, marble, granite, slate, ceramics, plastics, and the like.

The faces of non-metallic materials, such as refractory materials, concrete, granite, etc., has heretofore been surfaced through use of a rapidly rotating grinding wheel or grinding drum. Such grinding devices are only capable of taking a relatively thin cut at a time, removing a correspondingly thin depth of material from the work, which for example, is of the order of less than $\frac{1}{32}$ inch per cut. As a consequence, removal of a substantial total thickness of material is both very time consuming and costly. This adverse condition is further aggravated where the work is relatively wide and a surface cut must be taken across a correspondingly wide face of the work.

Accordingly, it is an object of the present invention to provide a rotatable milling cutter capable of taking a deep milling cut in relatively hard non-metallic materials, which, for example, may be one-half inch to one inch per cut, and at relatively low rotary speeds.

Another object of the invention is to provide a rotatable milling cutter capable of making surface cuts rapidly in relatively hard non-metallic materials, each cut being comparatively deep, if desired.

A further object of the invention is to provide a rotatable milling cutter that can be made relatively long so as to effectively take a wide surface cut on the work. In fact, the entire distance across comparatively wide work can be cut at the same time.

An additional object of the invention is to provide a milling cutter, particularly adapted for cutting hard non-metallic materials, that can be kept in a clean and cool condition, and in which the cuttings can be flushed away rapidly by a coolant flowing along its cutting surface.

Yet another object of the invention is to provide a milling cutter apparatus, including a plurality of like cutter sections, adapted to be appropriately assembled in endwise relation to one another to provide the desired overall cutter length. Thus, only a single length of a cutter section need be produced, the required number of sections being assembled adjacent to and aligned with one another, depending upon the width of cut to be taken across the face of the work.

Still a further object of the invention is to provide a rotatable milling cutter embodying diamond cutting elements arranged in such manner with respect to the rotational axis of the cutter as to secure a uniform cut across the entire face of the work.

Another object of the invention is to provide a milling apparatus, including a plurality of cutter sections assembled in endwise relation, in which each section embodies diamond cutting elements arranged in a particular pattern, the sections being related to one another in such manner that the pattern of the diamond elements continues from one cutter section to an adjacent section, enabling a uniform and uninterrupted cut to be taken across the entire face of the work.

A further object of the invention is to provide a rotatable milling cutter embodying diamond cutting elements arranged in such manner as to secure a uniform and uninterrupted cut across the entire face of the work, waterways being provided on the working face of the cutter through which a coolant can flow to flush the cuttings rapidly from the cutting region and to keep the cutter and its diamond elements clean and in a cool condition, thereby maximizing the effectiveness of the cutter and greatly increasing its working life.

This invention possesses many other advantages and has other objects which may be made more clearly apparent from a consideration of several forms in which it may be embodied. One of such forms is shown in the drawings accompanying and forming part of the present specification. The several forms will now be described in detail for the purpose of illustrating the general principles of the invention; but it is to be understood that such detailed description is not to be taken in a limiting sense, since the scope of the invention is best defined by the appended claims.

Figure 2:
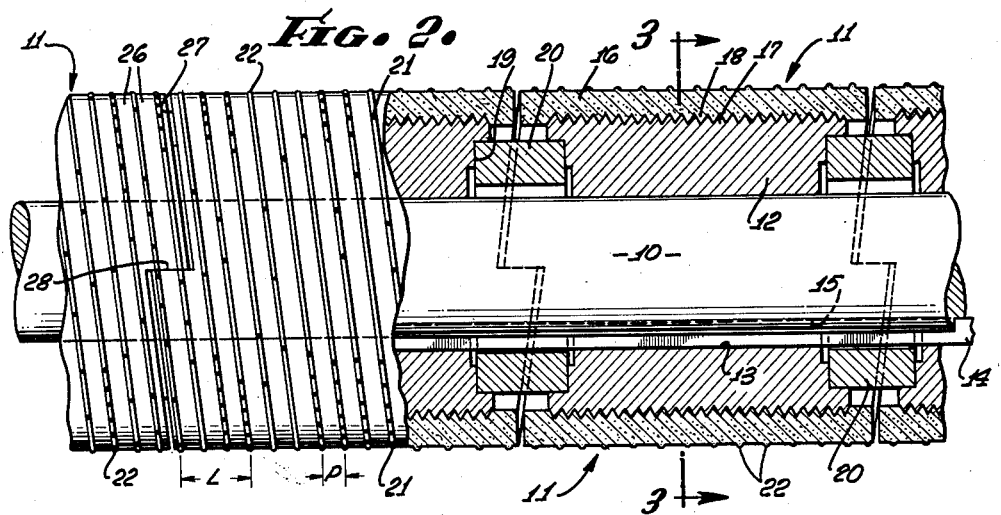
Figure 3:
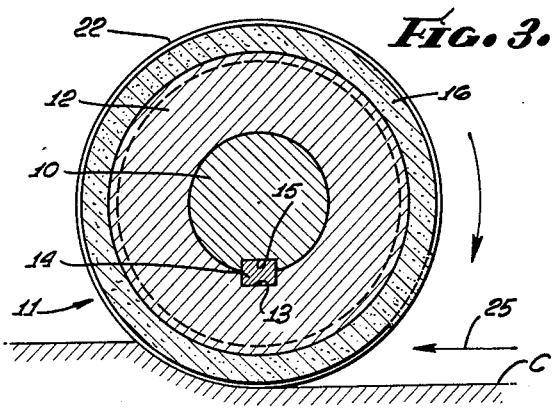

Referring to the drawings:
FIGURE 1 is an end view, partly in section, of a machine in which the cutter apparatus embodying the invention is mounted;
FIG. 2 is a combined elevational view and longitudinal section through a cutter assembly mounted in the machine disclosed in FIG. 1;
FIG. 3 is a cross-section taken along the line 3—3 on FIG. 2;
FIG. 4 is a longitudinal section, on an enlarged scale, through one of the milling cutter sections;
FIG. 5 is an end view, on a reduced scale, of the cutter section disclosed in FIG. 4;
FIG. 6 is a greatly enlarged elevation of a portion of the milling cutter;
FIG. 7 is a section taken along the line 7—7 on FIG. 6;
FIG. 8 is an isometric projection of one of the milling cutters.

In the drawings, a cutter assembly A is disclosed as being mounted in a machine B which rotates the cutter assembly at an appropriate speed, enabling it to take a cut upon the work mounted in the machine, which work, for example, may be a plurality of refractory or concrete blocks C mounted upon and suitably secured to the bed D of the machine, which is adapted to move the work transversely of the rotatable cutter assembly A. The machine itself includes a suitable supporting frame E, the cutter assembly being rotatably mounted in such frame and being rotated by a suitable mechanism (not shown).

As shown, the cutter assembly A includes a drive shaft or spindle 10 suitably rotatably mounted in the supporting frame E and to which the cutter members or sections 11 are secured. The cutter members are identical to one another. They each include an annular hub 12, that can be made of steel, and through which the drive shaft 10 passes, this hub having an internal longitudinal keyway 13 receiving a key 14, which also extends into a longitudinal external keyway 15 in the drive shaft or spindle. A generally cylindrical matrix body 16 is cast on the outer portion of the steel hub 12, being secured thereto by means of the interlocking external and internal ribs 17, 18 provided on the hub and the matrix body, respectively. Each end of the steel hub 12 has a counterbore 19 therein adapted to receive a spacer ring or washer 20, which may be made of steel, the drive shaft passing through the spacers 20. As described hereinbelow, each spacer has a particular width or thickness to insure the appropriate relation between adjacent cutters 11, 11 when the entire cutter assembly is mounted on and fixed to the drive shaft 10.

Diamond cutting elements 21 are mounted in the peripheral portion of each matrix body 16. As disclosed in the drawings, the generally cylindrical matrix body has helical ridges 22 of matrix material formed thereon in the manner of a multiple pitch thread, each ridge 22 having diamond cutting elements 21 embedded therein at its crest for the purpose of performing a cutting action on the work C. The spacing of the diamond cutting elements 21 from one another along its helical ridge 22 is such as to provide overlapping 23 between adjacent cutting elements in a direction normal to the axis of the milling cutter (FIGS. 2 and 6). Thus, the diamond elements 21 progressively overlap each other in the direction normal to the cutter axis, so as to insure that they will produce a continuous length of cut across the face of the work C during rotation of the cutter, there being no gaps or interruptions in the continuity of the cut.

The provision of multiple pitch helical ridges 22 means that the lead L of each helical ridge is several times the pitch P between adjacent ridges (FIG. 2). As an example, the lead L of a helical ridge can be four times the pitch P. In the example given, since the diamonds 21 in each helical ridge 22 progressively overlap each other in a direction normal to the axis of the cutter, the use of a lead that is four times the pitch will result in there being four sets of overlapping diamonds to provide a much greater number of diamonds capable of operating upon the work for each revolution of the cutter.

Only a single cutter 11 can be used, or a plurality of cutters mounted in endwise relation to one another, depending upon the distance across the work C on which a cut is to be taken. With a single milling cutter 11 rotated by the spindle 10, the work C is moved under the rotating cutter in the apparatus B illustrated in FIG. 1, and a cut taken across the work corresponding to the length of the cutter. Such cut is uniform and continuous across the work underlying the entire length of the cutter. During the operation of the cutter, a suitable coolant and flushing liquid is pumped against the surface of the work and the adjacent periphery of the milling cutter 11 (designated by arrow 25 in FIG. 3) to clean the cuttings from the work and to also maintain the milling cutter itself in a clean and cool condition. The helical ridges 22 provide helical waterways 26 between them around the periphery of the cutter, and during the direction of the cutting fluid against the cutter, the fluid can flow through these helical waterways to flush the cuttings therethrough and away from the cutting region, and also effect a distribution of the flushing liquid along the entire length of the cutter. Moreover, the passage of the flushing liquid or coolant through the helical waterways 26 brings them into effective contact with the diamond elements or stones 21 mounted in the ridges 22 on both sides of each waterway, to clean and cool the ridges themselves and the diamond elements mounted therein, the flushing liquid also passing across the ridges 22 to clean and cool them, as well as the diamond elements mounted therein. Thus, during operation of the milling cutter upon the work, the work region is maintained in a clean and cool condition, and also the milling cutter and all of its components, enabling the diamond cutting elements to have maximum cutting effectiveness on the work, greatly enhancing the life of the diamond cutting elements and of the entire milling cutter itself.

As disclosed in the drawings, a plurality of milling cutter members or sections 11 can be mounted in stacked relation, or in endwise adjacency, forming, in effect, a single cutter device of any desired length, so that an assembly A of cutters can operate upon relatively wide work and take a uniform cut across its entire face. The cutters 11 are so related to one another that their ridges 22 and the diamonds 21 in such ridges continue from one cutter 11 to an adjacent cutter 11, providing a cutter apparatus or assembly A which is, in essence, a single cutter device.

As shown in the drawings, the end faces 27 of the matrix body of each milling cutter also lie on a helix of the same inclination as the ridges 22. In the specific cutter illustrated, each end portion of the matrix body has two inclined or helical end faces 27, each extending 180 degrees around the matrix body 16. Each of such faces 27 lies substantially midway between adjacent ridges and terminates at a longitudinal or axial shoulder 28 that extends axially inwardly toward the commencement of the other face 27 at the same end of the matrix body. When two cutters 11 are placed in endwise relation, their shoulders 28 will overlap and the ridges 22 on one cutter will form a continuation of the ridges 22 of the adjacent cutter, as disclosed most clearly in FIG. 2. Such overlapping relationship between adjacent cutters 11, 11 and the continuity of their helical ridges 22 is obtained by providing spacer members 20 of the required width. A spacer member 20 is received in the opposed counterbores 19 of the steel hubs 12 of adjacent cutter members, the matrix bodies 16 extending axially beyond the steel hubs. When the bases of the counterbores 19 engage the sides of the spacer member 20, the helical ridges 22 of the cutters 11, 11 are in alignment with one another, as disclosed in FIG. 2, the shoulders 28 being maintained in appropriate overlapping relation by the keying of the cutter members 11 to the drive shaft or spindle 10. As a practical matter, a slight gap or space is provided between the adjacent end faces 27 of milling cutters to avoid placing their matrix bodies 16 in compression when the cutters are clamped in endwise relation to one another. Despite such space or gap, the ridges 22 still progress from one cutter smoothly into the adjacent cutter at their end portions.

The cutters 11 can be assembled in stacked or endwise relation to one another in any desired number within practical limits, depending upon the width of the work C on which a milling cut is to be taken. The cutters 11 are keyed to the spindle 10 with the intervening spacer members 20 in the counterbores 19, and the elements of the entire assembly clamped to one another by a suitable clamp means 30 (FIG. 1). The entire assembly of cutters is rotated as a unit and operates across the entire width of the work C as the latter is shifted under the rotating cutters 11. The overlapping relation 23 of the diamond cutting elements 21 referred to above (FIG. 6) insures the taking of a uniform cut across the entire width of the work, the effectiveness of the milling cutter apparatus being greatly increased by the provision of helical ridges 22 of multiple pitch. The juxtaposed end faces 27 on the cutters have the same pitch as the helical ridges 22, so that the ridges of one cutter are continuations of the ridges of an adjacent cutter.

In lieu of providing helical ridges 22 with individual diamond cutting elements 21 embedded therein in spaced and overlapping relation with respect to one another, the helical ridges may have diamonds impregnated therewithin, that is, the helical ridges comprise a substantially uniform mixture of small diamond grits in an appropriate matrix composition. With this arrangement, the depth of cut of the milling cutter or cutters in the work cannot be as great as when the individual diamond elements are molded in the helical ridges, the cutting apparatus operating more in the nature of the grinding wheel. The provision of the diamond impregnated matrix ridges still provides helical waterways 26 between the ridges 22 through with the flushing liquid can flow, for the purpose of maintaining the work region in a clean and cool condition, as well as maintaining the cutters themselves and their ridge portions in a clean and cool condition, thereby greatly enhancing the cutting effectiveness and life of the device.

The milling cutters are capable of rotating at milling cutter speeds, rather than grinding wheel speeds. Despite the ability of the milling cutters to operate in a highly effective manner on the work at much slower speed than grinding wheels or grinding drums, the cutters are still capable of taking a much deeper cut in the work. The present milling cutters have been found capable of taking cuts as deep as one inch in hard non-metallic materials, such as refractory materials for furnaces in which steel or glass is melted, and also in other hard materials, such as marble, granite, brick, concrete and slate. The cutter assembly A consists of individual cutters 11 that are identical, enabling the cutter assembly length to be readily varied, merely by placing any required number of cutters 11 in adjacent and overlapped clamped relation to one another, appropriately keyed to the rotatable drive shaft or spindle 10.

We claim:

1. In a milling cutter: a generally cylindrical unitary matrix body adapted to be rotated about an axis and having a helical ridge of matrix material having a crest and extending around its periphery through a plurality of revolutions; and individual diamond cutting elements spaced from each other along said ridge and embedded in said ridge at its crest and overlapping each other progressively along said ridge in a direction normal to said axis.

2. In a milling cutter: a generally cylindrical unitary matrix body adapted to be rotated about an axis and having multiple pitch helical ridges of matrix material having crests and extending around its periphery; and individual diamond cutting elements embedded in said ridges at their crests in spaced relation to each other, the elements in each ridge overlapping each other progressively along said ridge in a direction normal to said axis.

3. In a milling cutter: a generally cylindrical unitary matrix body adapted to be rotated about an axis and having multiple pitch helical ridges of matrix material having crests and extending around its periphery through a plurality of revolutions; and individual diamond cutting elements embedded in said ridges at their crests, the elements in each ridge being spaced from each other and overlapping each other progressively along said ridge in a direction normal to said axis.

4. In a milling cutter: a supporting hub having an axial bore through which a drive shaft is adapted to pass, said hub including means for attaching said hub to the shaft for rotation therewith; a generally cylindrical unitary matrix body surrounding and secured to said hub to rotate therewith; said matrix body having a helical ridge of matrix material having a crest and extending around its periphery and providing a helical waterway in said matrix material between the turns of said ridge; and individual diamond cutting elements embedded in said ridge at its crest in spaced relation to one another along said ridge and so related to each other as to collectively provide an uninterrupted length of cutting elements along substantially the entire longitudinal extent of said matrix body.

5. In a milling cutter: a supporting hub having an axial bore through which a drive shaft is adapted to pass, said hub including means for attaching said hub to the shaft for rotation therewith; a generally cylindrical unitary matrix body surrounding and secured to said hub to rotate therewith about an axis; said matrix body having a helical ridge of matrix material having a crest and extending around its periphery and providing a helical waterway in said matrix material between the turns of said ridge; and individual diamond cutting elements embedded in said ridge at its crest in spaced relation to one another along said ridge and overlapping each other progressively along said ridge in a direction normal to said axis.

6. In a milling cutter: a supporting hub having an axial bore through which a drive shaft is adapted to pass, said hub including means for attaching said hub to the shaft for rotation therewith; a generally cylindrical unitary matrix body surrounding and secured to said hub to rotate therewith about an axis; said matrix body having multiple pitch helical ridges of matrix material having crests and extending around its periphery and providing helical waterways in said matrix material between the turns of said ridges; and individual diamond cutting elements embedded in said ridges at their crests in spaced relation to each other along each of said ridges, the elements in each ridge overlapping each other progressively along said ridge in a direction normal to said axis.

7. In milling apparatus: a plurality of rotatable axially aligned milling cutters, each cutter including a body having a helical ridge extending around its periphery, and diamond cutting elements embedded in said ridge and so related to each other as to collectively provide an uninterrupted length of cutting elements along substantially the entire length of said body; and means securing said cutters to each other in endwise adjacency with the helical ridge of one cutter forming a continuation of the helical ridge of an adjacent cutter.

8. In milling apparatus: a plurality of aligned milling cutters rotatable about an axis, each cutter including a body having a helical ridge extending around its periphery, and diamond cutting elements embedded in said ridge and progressively overlapping each other in a direction normal to said axis; and means securing said cutters to each other in endwise adjacency with the helical ridge of one cutter forming a continuation of the helical ridge of an adjacent cutter.

9. In milling apparatus: a plurality of axially aligned milling cutters, each cutter including a body having a helical ridge extending around its periphery, and diamond cutting elements embedded in said ridge and so related to each other as to collectively provide an uninterrupted length of cutting elements along substantially the entire length of said body; the adjacent end faces of said bodies having the same lead as said helical ridges; and means securing said cutters to each other with said end faces contiguous each other and with the helical ridge of one cutter forming a continuation of the helical ridge of an adjacent cutter.

10. In milling apparatus: a plurality of rotatable axially aligned milling cutters, each cutter including a body having multiple pitch helical ridges extending around its periphery, and diamond cutting elements embedded in said ridges and so related to each other as to collectively provide an uninterrupted length of cutting elements along substantially the entire length of said body; and means securing said cutters to each other in endwise adjacency with the helical ridges of one cutter forming a continuation of the helical ridges of an adjacent cutter.

11. In milling apparatus: a plurality of axially aligned milling cutters, each cutter including a body having multiple pitch helical ridges extending around its periphery, and diamond cutting elements embedded in said ridges and so related to each other as to collectively provide an uninterrupted length of cutting elements along substantially the entire length of said body; the adjacent end faces of said bodies having the same lead as said helical ridges; and means securing said cutters to each other with said end faces contiguous each other and with the helical ridges of one cutter forming a continuation of the helical ridges of an adjacent cutter.

12. In milling apparatus: a plurality of axially aligned milling cutters, each cutter including a supporting hub, a generally cylindrical matrix body surrounding and secured to said hub to rotate therewith, said body having a helical ridge of matrix material extending around its periphery and providing a helical waterway between the turns of said ridge, and diamond cutting elements embedded in said ridge and so related to each other as to collectively provide an uninterrupted length of cutting elements along substantially the entire length of said matrix body; and means securing said supporting hubs together with the end faces of said bodies in endwise adjacency and with the helical ridge of one body forming a continuation of the helical ridge of an adjacent body.

13. In milling apparatus: a plurality of axially aligned milling cutters, each cutter including a supporting hub, a generally cylindrical matrix body surrounding and secured to said hub to rotate therewith, said body having a helical ridge of matrix material extending around its periphery and providing a helical waterway between the turns of said ridge, and diamond cutting elements embedded in said ridge and so related to each other as to collectively provide an uninterrupted length of cutting elements along substantially the entire length of said matrix body; the adjacent end faces of said bodies having the same lead as said helical ridges and each of said faces extending axially beyond its companion ridge; and means securing said supporting hubs together with said end faces in endwise adjacency and with the helical ridge of one body forming a continuation of the helical ridge of an adjacent body.

14. In milling apparatus: a plurality of axially aligned milling cutters, each cutter including a supporting hub, a generally cylindrical matrix body surrounding and secured to said hub to rotate therewith, said body having multiple pitch helical ridges of matrix material extending around its periphery and providing helical waterways between the turns of said ridges, and diamond cutting elements embedded in said ridges and so related to each other as to collectively provide an uninterrupted length of cutting elements along substantially the entire length of said matrix body; the adjacent end faces of said bodies having the same lead as said helical ridges and each of said faces extending axially beyond its companion ridge; and means securing said supporting hubs together with said end faces in endwise adjacency and with the helical ridges of one body forming a continuation of the helical ridges of an adjacent body.

15. In milling apparatus: a plurality of axially aligned milling cutters, each cutter including a supporting hub, a generally cylindrical matrix body surrounding and secured to said hub to rotate therewith, said body having a helical ridge of matrix material extending around its periphery and providing a helical waterway between the turns of said ridge, and diamond cutting elements spaced from each other and embedded in said ridge and overlapping each other progressively along said ridge in a direction normal to said axis; the adjacent end faces of said bodies having the same lead as said helical ridges and each of said faces extending axially beyond its companion ridge; and means securing said supporting hubs together with said end faces in endwise adjacency and with the helical ridge of one body forming a continuation of the helical ridge of an adjacent body.

16. In milling apparatus: a plurality of axially aligned milling cutters, each cutter including a supporting hub, a generally cylindrical matrix body surrounding and secured to said hub to rotate therewith, a helical ridge extending around the periphery of said body and providing a helical waterway between the turns of said ridge, said ridge comprising diamond cutting elements impregnated in matrix material integral with said body; the adjacent end faces of said bodies having the same lead as said helical ridges and each of said faces extending axially beyond its companion ridge; and means securing said supporting hubs together with said end faces in endwise adjacency and with the helical ridge of one body forming a continuation of the helical ridge of an adjacent body.

17. In milling apparatus: a shaft; a plurality of axially aligned milling cutters on said shaft; each cutter including a supporting hub secured to said shaft to rotate therewith, a generally cylindrical matrix body surrounding and secured to said hub, said body having a helical ridge of matrix material extending around its periphery and providing a helical waterway between the turns of said ridge, and diamond cutting elements embedded in said ridge and so related to each other as to collectively provide an uninterrupted length of cutting elements along substantially the entire length of said matrix body; the adjacent end faces of said bodies having the same lead as said helical ridges and each of said faces extending axially beyond its companion ridge; a spacer surrounding said shaft between and engaging the hubs of adjacent milling cutters; and means securing said supporting hubs against said spacer with said end faces in endwise adjacency and with the helical ridge of one body forming a continuation of the helical ridge of an adjacent body.

18. In milling apparatus: a shaft; a plurality of axially aligned milling cutters on said shaft; each cutter including a supporting hub secured to said shaft to rotate therewith, a generally cylindrical matrix body surrounding and secured to said hub, said body having a helical ridge of matrix material extending around its periphery and providing a helical waterway between the turns of said ridge, and diamond cutting elements embedded in said ridge and so related to each other as to collectively provide an uninterrupted length of cutting elements along substantially the entire length of said matrix body; the adjacent end faces of said bodies having the same lead as said helical ridges and each of said faces extending axially beyond its companion ridge; the adjacent end portions of said hub having confronting counterbores; a spacer in said counterbores engaging the hubs of adjacent milling cutters; and means securing said supporting hubs against said spacer with said end faces in endwise adjacency and with the helical ridge of one body forming a continuation of the helical ridge of an adjacent body.

19. In milling apparatus: a shaft; a plurality of axially aligned milling cutters on said shaft; each cutter including a supporting hub secured to said shaft to rotate therewith, a generally cylindrical matrix body surrounding and secured to said hub, said body having ridges of matrix material extending around its periphery and providing waterways between said ridges, and diamond cutting elements embedded in said ridges; the adjacent end portions of said hub having confronting counterbores; a spacer in said counterbores engaging the hubs of adjacent milling cutters; and means securing said supporting hubs against said spacer with the confronting end faces of said bodies closely adjacent to each other.

20. In milling apparatus as defined in claim 7; wherein said body is generally cylindrical, said ridge comprising matrix material, said diamond cutting elements being embedded in said ridge by being in impregnated relation in said matrix material.

21. In milling apparatus as defined in claim 9; wherein said body is generally cylindrical, said ridge comprising matrix material, said diamond cutting elements being embedded in said ridge by being in impregnated relation in said matrix material.

References Cited by the Examiner

UNITED STATES PATENTS

| 1,097,565 | 5/14 | Straubel | 51—206 |
| 1,628,352 | 5/27 | Bonazzi. | |
| 2,020,117 | 11/35 | Johnston | 51—206 XR |
| 2,170,329 | 8/39 | Hoke | 51—206 |
| 2,383,464 | 8/45 | Bown | 21—206 |

FOREIGN PATENTS

| 703,060 | 2/41 | Germany. |
| 120,800 | 11/18 | Great Birtain. |

LESTER M. SWINGLE, *Primary Examiner.*